INVENTORS.
WILLIAM J. RACINE
THOMAS W. KUNKEL
JAMES H. CALDWELL, JR.
BY EDWARD T. TREGILGAS JR.

Grant L. Hubbard
ATTORNEY.

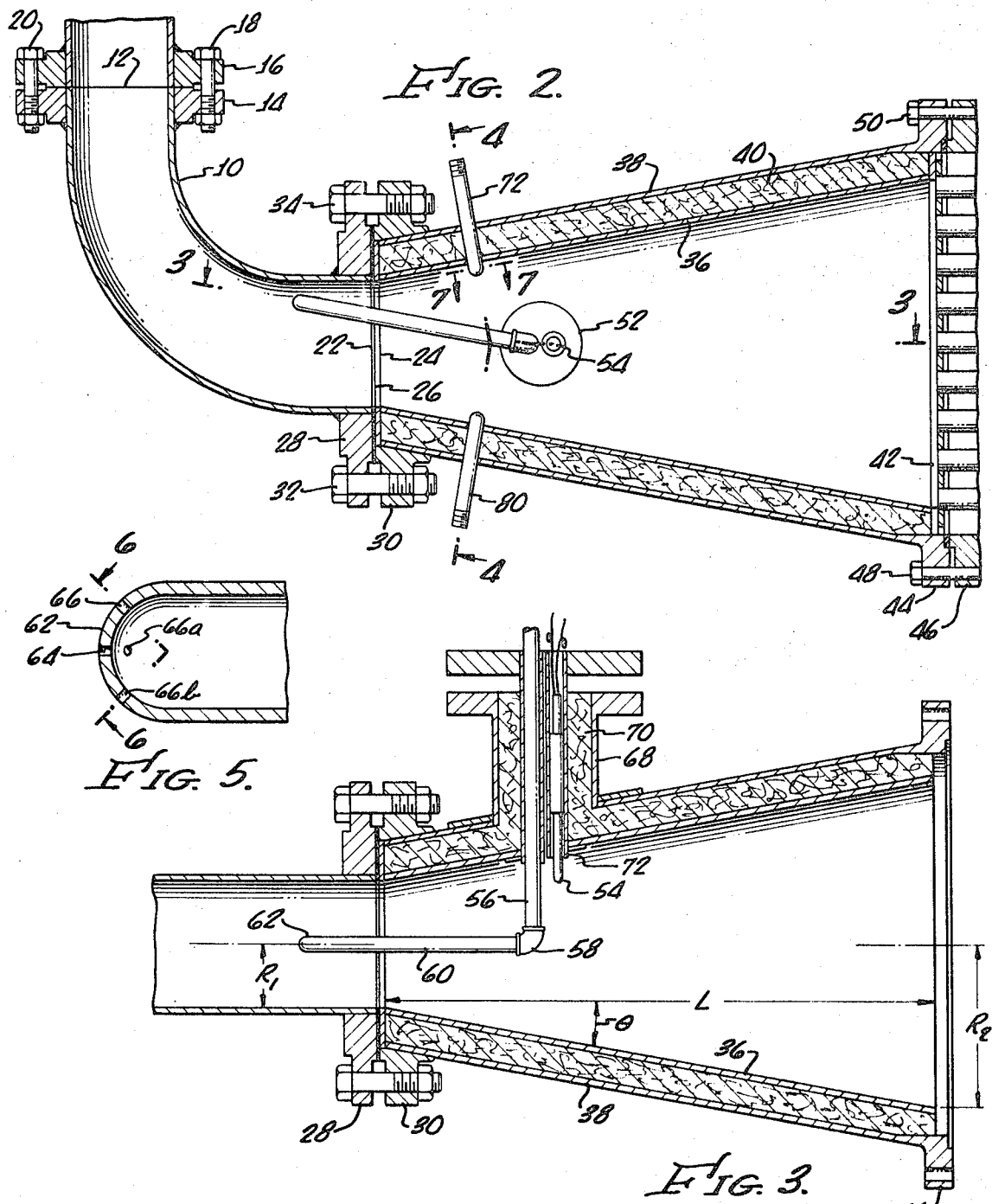

United States Patent Office

3,574,781
Patented Apr. 13, 1971

3,574,781
TRANSITION SECTION FOR ETHYLENE PRODUCTION UNIT
William J. Racine, Los Alamitos, Thomas W. Kunkel, Long Beach, James H. Caldwell, Jr., Manhattan Beach, and Edward T. Tregilgas, Jr., Palos Verdes Estates, Calif., assignors to Atlantic Richfield Company, Philadelphia, Pa.
Filed Feb. 14, 1968, Ser. No. 709,528
Int. Cl. C07c *3/08;* C10g *9/16, 9/18*
U.S. Cl. 260—683
10 Claims

ABSTRACT OF THE DISCLOSURE

A transition section for expanding coke-forming hydrocarbon gases from an ethylene cracker prior to passage of such gases through a heat exchanger for preventing the formation of coke in the transition unit including a frusto conical expansion section of critical angular dimension and including steam injection conduits for forming a steam sheath adjacent the walls of the expansion section for preventing coke formation is disclosed.

BACKGROUND OF THE INVENTION

Field of the invention

This invention relates to apparatus and the process for producing ethylene and propylene and otherwise treating hydrocarbonaceous materials. More specifically, the present invention relates to a process and apparatus for reducing the formation of coke between a high temperature hydrocarbon treater and a heat exchanger.

Description of the prior art

It is conventional practice to produce ethylene by thermally or otherwise cracking ethane and propane. High temperature treating of hydrocarbons in general is conventional practice. Further, high temperature treating of organic materials in general is widely practiced. One problem which is common to a great many such processes is that during the high temperature treating step or subsequently, or both, there is a strong tendency for the organic compound being treated or which has been treated and which is at a high temperature to decompose to form carbon or highly polymerized carbonaceous compounds and intermediate products. This phenomena is commonly referred to as "coking" and usually results in the deposition of coke or a polymeric tar-like substance on the walls of the reaction vessels, conduits, treating vessels and the like. At higher temperatures, it is common for a very hard and often refractory layer of carbon or coke to form on the walls of thermal reactors, conduits and heat exchangers.

In the production of ethylene and propylene it is conventional practice to obviate to a large degree the problem of coke formation during and following the cracking step by passing the hot cracked gaseous stream through a uniformly sized conduit directly to a quench tower where the hot gases are contacted with water. It is generally agreed that good engineering practice requires that the conduit system between the cracker and the quench tower be as short as possible and free of structures which disturb the flow of the gas. Such practice is successful in the sense that coke formation is held to a minimum. However, large amounts of heat which is residual in the cracked gas stream is wasted.

It is known to pass the heated gas from the cracking unit through a heat exchanger prior to entry into the quench tower for the purpose of extracting heat values from the gas stream. Such systems have been successful in recovering the valuable heat for producing process steam or for other purposes but this approach has never been entirely satisfactory because of the problems resulting from the formation of coke in the conduit system. In accordance with accepted engineering practice, it was generally believed that the gas stream should be carried through a uniform diameter conduit as far as possible and then permitted to expand rapidly for passage into a heat exchanger. As will be pointed out in the body of the specification, this approach, in spite of the validity of the general principles involved, was not successful in avoiding the undue formation of coke in the conduit transition section between the cracker unit and the heat exchanger. It is, accordingly, an object of this invention to provide an improved transition section.

It does not appear that a theoretical analysis of the inter-relation of fluid flow problems and coke formation has ever been made but it is known that certain types of flow regimes, in gases generally, may be established depending upon the conduit system involved and certain theoretical or empirical data can be determined from these flow regimes. As illustrated hereinafter, for example, it is known that when a gas exits from a conduit into an expander a certain type of flow regime will result depending upon the relative dimensions of the conduit and of the expander. In general, the possibilities are as follows: a region of no appreciable stall in which the main flow is well behaved and the flow does not separate from the walls of the expander may result; a region of large transitory stall in which the separation varies in position, size, and intensity with highly pulsating flow patterns may result; a region of fully developed stall in which the major portion of the diffuser is filled with a large triangular shaped turbulent recirculation region extending from the diffuser exit to a position close to the diffuser throat with the main flow following along one wall continuously and relatively smoothly may result; and, finally, a jet flow region in which the main flow is separated from the walls of the diffuser may result. In the latter case, the separation may begin very near the throat or further downstream from the throat and does not reattach until well downstream of the diffuser.

It is known that gas residence time is a factor in determining the rate of coke buildup and it was theorized that if a proper flow pattern could be established residence time and, consequently coke formation may be reduced. In the present case, it became apparent that these considerations were directly applicable to the problem at hand when an explanation for the problem and for certain preliminary solutions were sought. Stated differently, these considerations are believed to be applicable as an explanation for the result accomplished, as viewed in retrospect, even though there are certain factors which may not fully be explained using these principles, even as viewed after the fact.

The prior art discloses a large number of cracking units and a great variety of heat exchangers. In the particular embodiment in which the present invention is utilized a tubular heat exchanger is used but any of the prior art heat exchangers may be substituted therefor. Since the present invention relates to a process involving a particular transition phenomena and to a transition section alone and in the combination where applied, the teachings of the prior art with respect to cracking units in general and to heat exchangers in general will be relied upon. Accordingly, the principal object of this invention is to provide a process and a system for transferring hot gaseous carbonaceous materials from a cracker to a heat exchanger without the formation of undesirable coke and carbon containing deposits.

SUMMARY OF THE INVENTION

The present invention may be described, in its preferred embodiment briefly and without intending to limit the scope of the inventive concept or of the process or apparatus, as a transition section for passing cracked hydrocarbon gases from an ethylene production cracker to a tubular heat exchanger. The transition section includes a conical expansion zone defined by a frusto conical expansion section wherein the ratio of the length of the expansion section to the input radius lies between about 3 and 30 and wherein the relative angle of divergence of the frusto conical section with respect to the axis of the input throat lies between about 3 and 18 degrees and is preferably about 10 degrees. If a non-coke forming liquid, such as water, is injected into the periphery of the expanding gas stream so as to form a generally conical laminar sheath of steam adjacent the walls of the conical expander coke deposition is generally reduced and, under normal operating conditions, substantially eliminated. Water is also injected in an L-conduit which passes the heated hydrocarbon gases downwardly and through 90 degrees outwardly to the expander section. Thus, in its most comprehensive and preferred form, to which the invention is not necessarily limited, the transition section may be described as an L-conduit of approximately uniform diameter connected to the bottom of a cracking unit, a frusto conical expander section connected to the output of the L-conduit, the conical section having the aforementioned critical dimensions and angular relationships, a plurality of steam injection conduits in the top and bottom of the conical section and a steam injection conduit in the L-conduit, the output of the transition section being connected to the input of a heat exchanger.

A principal object of the invention is to provide an improved process for controlling the flow of hot hydrocarbon gases and the like for preventing coke formation therefrom.

Another principal object of the invention is to provide a transition section of critical dimension and angular relationship for preventing coke formation from a hot hydrocarbon gas stream.

A further object of the invention is to provide a process for expanding a stream of hydrocarbon type vapors exiting from a high temperature treating zone at velocities in the range of about Mach 0.4 to Mach 0.7 and temperatures above 1000° F. in a conical expansion zone having an input radius R, a length L and an expansion angle $\theta$, $2\theta$ being less than about $$10^{(1.78-.39 \log_{10} L/R)}$$

and preferably about $$10^{(1.54-.48 \log_{10} L/R)}$$

An additional object of the invention is to provide a frusto conical expansion section having the above defined dimensional and angular relationships.

A more specific object of the invention is to provide a process and a transition section for expanding hydrocarbon vapors as described above and for injecting a non-coke forming fluid such as water into peripheral portions of the stream to form a protective sheath for preventing undue formation of coke in said transition section.

A more specific object of the invention is to provide a system including a cracking unit, a transition section and a heat exchanger wherein the transition section is specifically dimensioned and disposed to prevent coke formation therein and includes steam injection conduits for reducing or preventing the formation of coke.

An important and perhaps critical facet of the invention is the provision of novel steam injection patterns for preventing the formation of coke in an expander section for the passage of coke-forming gases.

The process as described hereinafter and the apparatus in its preferred form as described hereinafter constitute further and yet more specic objects of the invention. Other objects will be apparent from the specification which follows and from the drawings to which reference is now made,

BRIEF DESCRIPTION OF THE DRAWING

FIG. 2 is a vertical cross-sectional view showing the condensate injection conduits in the transition section.

FIG. 3 is a horizontal view of the transition section taken along lines 3—3 of FIG. 2 illustrating the dimensional and angular measurements thereof.

FIG. 5 is a detailed end view of the condensate injection conduit, showing the injection apertures, for injecting condensate in the L of the transition section.

FIG. 6 is an end view of the injection conduit of FIG. 5 looking outwardly, taken along lines 6—6.

FIG. 7 is an end view of the injection conduit of FIG. 2, looking outwardly, taken along lines 7—7.

DESCRIPTION OF THE PREFERRED EMBODIMENT

Figure 1:
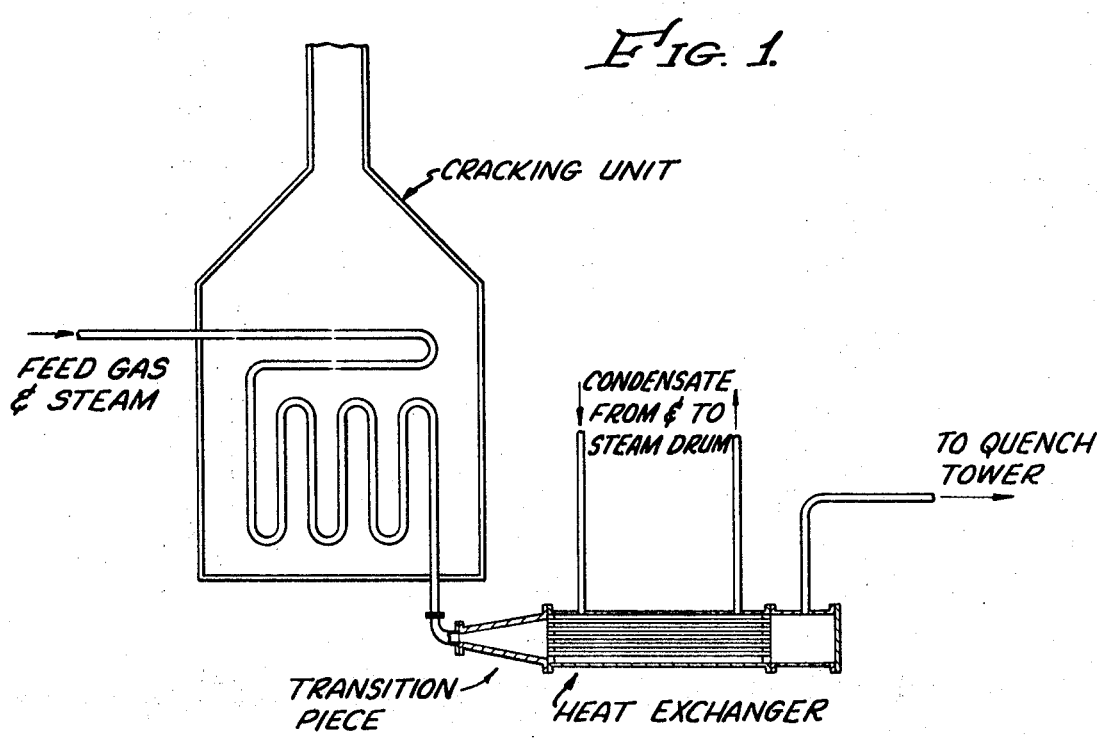
FIG. 1 is an overall flow scheme of the present invention showing the major components thereof.

The nature of the problem here involved and the solution thereto will be discussed at length hereinafter but reference is made to the drawing now as conducive to the understanding of the present invention and the development thereof.

In a known process, ethylene may be produced by passing feed gas and steam through a cracking unit as shown in FIG. 1 and then to a quench tower. Also, it is known to pass the cracked feed gas stream through a transition piece to a heat exchanger in which the residual heat of the cracked gas stream is extracted. This heat may be used to produce process steam. Thus, the major components of the system are the cracking unit, the transition piece and the heat exchanger, along with the quench tower. The quench tower in the present invention functions according to conventional operating principles. Briefly, however, the cracked gas which includes ethylene and/or propylene along with unreacted ethane and/or propane, hydrogen, heavier hydrocarbons, and other gases are subjected to a preliminary scrubbing and separation operation. In following stages, the gases are subjected to separation processes for producing the substantially pure ethylene and propylene and for recycling the unconverted ethane and propane.

Because of the problems which have been briefly described previously and will be considered in greater detail hereinafter, it was necessary to redesign the transition section several times before a satisfactory configuration and process was achieved. In the presently preferred embodiment, the transition section includes two major components. The first is an L-conduit 10 which may be of substantially uniform cross-section or may slightly diverge. Insofar as the present invention is concerned, the divergence is immaterial except insofar as it may affect the flow of the gas stream as it exits from the L. The input opening 12 of the L-conduit 10 is secured by a flange 14 to a flange 16, the latter being connected to the output of the cracking unit, by means of bolts 18 and 20. Obviously, any conventional mechanical inter-connection may be used, and, if desired, the L may be welded to the output of the cracking unit. The hot gases from the cracking unit flow downwardly initially in the L and are diverted through substantially 90 degrees and exit from the outlet end of the L 22 which is connected to the throat 24 of the expansion section, to be described hereinafter, by a gasket 26 and is secured by means of flanges 28 and 30 and bolts 32 and 34.

The transition section includes as its most critical component an expansion section formed of a frusto conical wall piece 36 separated from a larger frusto conical wall piece 38 by an insulation section 40. The larger end of the frusto conical expansion section 42 is secured by means of flanges 44 and 46 and bolts 48 and 50 to the input of the heat exchanger. As illustrated, the heat exchanger may be a tubular bundle of conventional design or any other type of heat exchanger. The criticality of the operation of the process and the effectiveness of the transition section will be discussed with respect to the tubular bundle type of heat exchanger for convenience.

A side inlet passageway 52 is adapted to receive a thermocouple 54 which extends into the stream of gas flowing through the transition section.

During operation, it was discovered that coke formed in the L 10 on the interior wall near the point of greatest curvature. It was thought that this may have resulted from a stationary eddy formed in that region and a steam injection conduit system including an input conduit 56, an L 58 and an extension 60, having an end 62 was installed. The end 62 of the extension 60 is provided with a centrally disposed injection aperture 64 and four circumferentially equally spaced apertures 66 disposed at 45 degrees from the axis of the injection extension conduit 60. This reduced but did not completely eliminate the formation of the coke in the L but, quite surprisingly, reduced the rate of formation of coke downstream from the point of injection into the expansion section. As shown in FIG. 3, the thermocouple passage and the conduit 56 are received in an insulated housing tube 68 and protected by insulation 70.

Subsequently, a plurality of water injection conduits were installed in the upstream portion of the expansion section near the entry throat thereof. At first, injection conduits 72, 74 and 76 were mounted for extending into the expansion section substantially perpendicularly to the walls thereof. The axis of these conduits lie at approximately 30 degrees with respect to each other and intersect at the axis of the expansion section. Subsequently, it was determined that the injection conduits 78, 80 and 82 should be installed in the bottom of the expansion section in mirror image disposition.

The end configuration 84 of each of these injection conduits is illustrated in FIG. 7. Four injection apertures 86, 88, 90 and 92 are provided through the wall of the conduit substantially perpendicularly to the axis of the conduit and having axes oriented at approximately 22½ degrees with respect to each other. The purpose and effect of this disposition of each of the injection conduits and of the injection apertures therein is to provide a plurality of diverging streams adjacent the conical walls of the expansion section which at least partially overlap. The effect of this injection system is apparently to provide a conical expanding generally laminar sheath of steam adjacent the walls of the expansion section. The steam, of course, results upon the injection of the water into the high temperature hydrocarbon gas stream.

At startup, the longest runs which were possible were from 10 to 12 days. A number of mechanical changes in the configuration of the transition section and in auxiliary units associated therewith were not effective in overcoming the coking problem which limited the length of run. Quench water was successful to a degree in reducing coke formation and the length of run was increased to 15 days.

The angular relationship of the expansion section was changed and immediate improvement was noted. Following this, sevaral changes were made in the construction of the expansion section. It was determined that if certain angular and dimensional considerations were adhered to massive formation of coke could be prevented; however, a thin layer of coke continued to form along the walls of the expansion section. Flakes of this layer would break off and, in time, plug the heat exchanger. In the existing installation, ideal operation was found to require both proper angular and dimensional relationships and the injection of water; however, water injection may be omitted in a new installation designed according to the principles set forth herein.

Reference is made now to FIG. 3 which shows the points of measurement of the angles and dimensions which have been found to be critical for optimum and fully satisfactory operation. $R_1$ is the radius of the conduit input to the transition expansion section; $R_2$ is the major radius of output of the transition section; L is the length along or parallel to the axis of the expansion section and $\theta$ is the angle of divergence of the walls of the transition section and may be measured with respect to the axis of the transition section for a line parallel thereto, as indicated in FIG. 3. It will be immediately apparent that these variables are not independent. In practice, as a matter of engineering necessity or efficiency, the radius of the input conduit will be relatively fixed in the sense that only small variations in this radius can be tolerated because of velocity and other operating considerations. Often the major radius $R_2$ will be substantially fixed by the design and input size of the heat exchanger into which the transition section operates. Depending upon the particular construction in existence the length may be varied to a greater or lesser degree. In new installations there is practically no limit as to the length which, theoretically, could be used but good engineering practice suggests that a minimum length consistent with satisfactory operation be used. Assuming that these three linear dimensions are fixed, the angle $\theta$ will also be fixed. Thus, $\theta$ can be varied only by adjusting the length or one of the radii. During preliminary stages of experimentation and during several months of experimental operation using varying designs of the transition section the output radius of the expansion section was varied. This proved the principles involved in the design but led to unsatisfactory operation of the heat exchanger input. Of course, in a new installation these problems can be obviated by proper engineering design and utilization of the principles set forth herein.

The critical dimensions and angular relationships involved may be considered with respect to three operating conditions. It has been found that when the length is between three and thirty times the input radius $R_1$ and $2\theta$ is greater than $$10^{(1.78-.39 \log_{10} L/R_1)}$$

a region of stationary stall or fixed eddy formation occurs adjacent the walls of the expansion section. When this operating situation obtains, coke builds up very rapidly in the expansion section, sometimes to a thickness of several inches. The injection of steam upstream of the major portion of the expansion section tends to reduce the coke buildup but satisfactory operation is not possible even using steam in this operating design.

When $L/R_1$ is between 3 and 30 and $2\theta$ is less than $$10^{(1.78-.39 \log_{10} L/R_1)}$$

a region of transitory stall or intermittent eddy formation occurs in the expansion section. Satisfactory operation is impossible in this region in the absence of steam injection; however, it has been found that if steam is injected by means and according to the principles set forth hereinbefore to form a sheath along the walls of the expansion section coke formation may be reduced and effectively eliminated as a limiting factor in operation. In the absence of steam, however, coke formation is fairly rapid and uneven, and satisfactory operation for long periods is not possible.

When the ratio $L/R_1$ is between 3 and 30 and $2\theta$ is less than $$10^{(1.54-.48 \log_{10} L/R_1)}$$

there is substantially no boundary layer separation of the gases exiting from the conduit into the expansion section and, consequently, the gases flow through the transition expansion section without the formation of stalls or eddies. Without the injection of steam improved operation may result; however, even under these approximately ideal flow conditions a layer of coke which is approximately uniform builds up in the transition section and flakes off tending to plug the heat exchanger. Thus, coke formation in the transition section remains the limiting factor with respect to length of run between cleanup or turn around.

The present invention has been so successful that injection of steam according to the principles and methods set forth hereinbefore eliminates coke formation to the extent that coke buildup in the transition section is no longer a limiting factor in run length.

In the abstract, one may infer from the foregoing considerations that it would be desirable to operate in the region wherein $L/R_1$ is between 3 and 30 and $2\theta$ is less than $$10^{(1.78-.39\ \log_{10}\ L/R_1)}$$

however, it is highly desirable from an overall engineering point of view to construct a unit as compactly as possible. Therefore, assuming the usual situation wherein $R_1$ and $R_2$ are relatively fixed according to other engineering principles, it is desirable to make the length L as short as possible consistently with a proper angular relationship as just described. Accordingly, it is desirable to operate in the region wherein $L/R_1$ is between 3 and 30 and $2\theta$ is less than $$10^{(1.54-.48\ \log_{10}\ L/R_1)}$$

and greater than $$10^{(1.54-.48\ \log_{10}\ L/R_1)}$$

and as near to the former limitation as is possible for most compact construction.

It will be immediately apparent to those skilled in the art who understand the inherent difficulties in measuring and controlling fluid flow characteristics, especially where the composition of the fluid may vary, that the limitations hereinbefore described are approximately correct but that, using the principles set forth the angular and dimensional relationships must be varied depending upon the type of stream being handled. It has been found that using the streams involved herein and the velocities involved herein these limitations on maimum values for $2\theta$ are satisfactory. It is expected that the maximum operating angle would be slightly reduced at higher gas velocity. Obviously one could operate in the region wherein $L/R_1$ is less than 3 or greater than 30 without departing from the principles of the invention. However, in general such opertaion would not be desirable from an engineering point of view. Accordingly, in order to describe the invention in terms of practical engineering concepts the operating region has been defined with respect to these dimensions but the proper operating angle for any $L/R_1$ ratio could be derived using the foregoing principles.

Early embodiments of the invention which were used experimentally were constructed such that $2\theta$ was less than $$10^{(1.54-.48\ \log_{10}\ L/R_1)}$$

Operation, insofar as the transition unit was concerned, was satisfactory but overall operation was not entirely satisfactory because of the fixed size of heat exchanger into which the transition section had to operate. It was, subsequently, determined that by moving up into the transitory stall region and injecting steam satisfactory operation could be achieved, contrary to previously held conceptions on prior operating experience. It was found, however, that above the maximum limitation for $2\theta$, $$(2\theta = 10^{(1.78-.39\ \log_{10}\ L/R_1)})$$

even the injection of steam did not produce satisfactory results.

In a particular operating embodiment which has been found to be satisfactory and which has recently been adopted for commercial use, though further experimentation is required to determine exact optimum operating dimensions and characteristics, $R_1$ is 4¹⁵⁄₁₆ inches, $R_2$ is 10⁵⁄₁₆ inches, L is 37⅜ inches, and $\theta$ is 10 degrees. The injection conduits 72, 74, etc. intersect the interior wall 36 at a point approximately ⅙ of the distance from the smaller end to the larger end of the expansion section. Input velocity of the hydrocarbon fluid is approximately 900 ft. per second, in optimum operation, and sufficient steam, about 700 lbs. per hour, is added to prevent a reduction in effective velocity at the entrance to the heat exchanger. That is, the velocity of the gas entering the expansion section is approximately the same as that entering the heat exchanger; i.e. approximately 900 ft. per second. These velocities are on the order of approximately Mach 0.5 but may range from about Mach 0.4 to Mach 0.7. The speed of sound is proportional to $KT/3M$, all of which will vary considerably depending upon the feed stock, conversion level and steam injection rate, consequently the Mach velocity is subject to considerable variation. As previously indicated, these composition considerations will dictate a shift in the limitations found to be desirable for the particular operating ciricumstances described.

Under conditions described and using the improved transition section, very striking results have been obtained. For example, at startup, the longest runs that could be made were approximately 10 to 12 days in length. Subsequently, by steam injection and other changes in operating characteristics, the maximum run length was increased to about 15 days. The economics of short runs of this duration were not satisfactory because of the loss of production and the actual cost of cleanup during the shutdown. By adoption of the invention just described, the length of run has been increased to 70 to 80 days between shutdowns. Shutdown and turnaround is no longer limited by coking in the transition section but rather by coking in the heater and by other operating characteristics. Thus, whereas before the installation of the apparatus of this invention and the utilization of the process of the invention the bottleneck in the operation was coke formation in the transition section, this is no longer a serious problem, although the transition section is cleaned during each period of shutdown.

Since there is inherently a reduction in temperature of the gases as a result of the injection of water there has been some potential loss of heat recovery. That is, the input heat to the heat exchanger is somewhat reduced as a result of the injection of water. In practice, however, this has not been found to be a substantial factor. The temperature input to the transition section is approximately 1570° F. and the temperature input to the heat exchanger is approximately 1050° F. Thus, some reduction in process steam production has been noted but any loss in production of process steam has been offset manyfold by savings in increased production and reduced operating costs.

Figure 8:
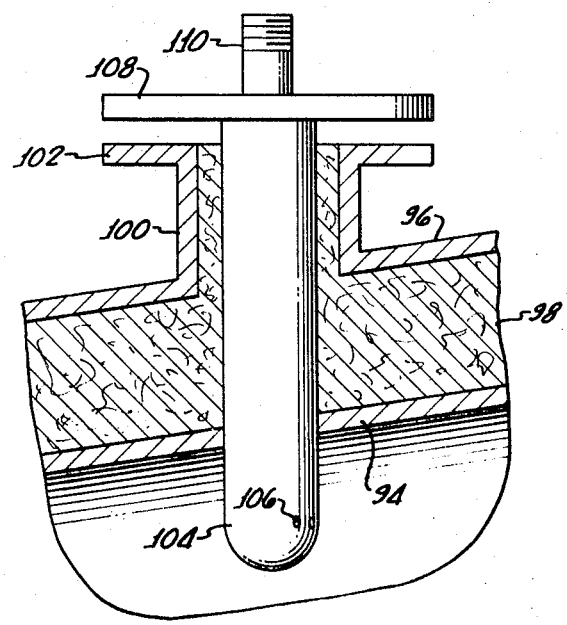
FIG. 8 is a modified preferred embodiment of the disposition of the injection conduits in the transition section showing means for adjustably positioning said conduits.
Figure 4:
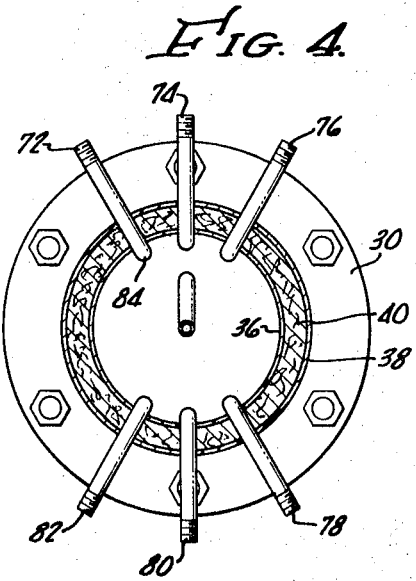
FIG. 4 is an end cross-sectional view taken along lines 4—4 of FIG. 2 showing the preferred disposition of condensate injection conduits in the transition section.

An alternative and preferred embodiment of the invention is shown in FIG. 8 illustrating an advantageous means for adjustably movably mounting the condensate injection conduit in the transition section. In this embodiment, the wall of the modified transition section 94 is provided with an aperture. An outer wall 96 is spaced from the inner wall 94 by a layer of insulation 98 and is provided with an annular sleeve 100 and a mounting flange 102. The injection conduit 104, provided with apertures 106, extends through the insulation 98 and the sleeve 100 and into the frusto conical expansion section defined by wall 94. The flange 108, secured to the injection conduit 104, may be secured to the flange 102 by bolts, clamps, or any desired means. The condensate is supplied to the injection conduit through a threaded inlet 110. It will be apparent that the spacing between the flange 102 and the flange 108 may be varied as desired thus positioning the internal end of the injection conduit 104 and the injection apertures 106 as desired in the frusto conical exchange section. Thus, the point of injection of non-coking fluid may be varied according to operating conditions and the injection conduit may be removed for cleaning and repair without opening the transition section.

The present invention has been described and is claimed in terms of the particular processes in which it has been proved; namely the production of ethylene, propylene, and the like. It will be apparent that the principles of the invention, the process of the invention, and the apparatus described and claimed may be used in any system wherein hydrocarbon gases are transported at high temperatures and expanded. Hydrocarbon is used herein in the broad sense to include not only those chemicals which, in the pure sense may be considered to be hydrocarbons but those chemicals which are substantially composed of carbon and hydrogen although they may include nitrogen, oxygen, etc. Water has been used as the primary quenching and steam injection source but any non-coke forming liquid would be euqivalent and may be used without departing from the invention. Apparently because the hot gases enter the expansion section from an L, there is some effect upon the rate of expansion in the various areas of the expansion section and it has been found unnecessary, but highly desirable, to form a steam sheath around the entire circumference of the expansion section. Accordingly, it is sufficient for the purposes of this invention to provide a steam sheath around a large portion or a substantial portion of the walls if other operating characteristics are analogous to those observed during the development of this invention.

It will be apparent from the foregoing that several modifications and departures may be made from the exact construction described herein without departing from the spirit and scope of the invention as defined in the following claims.

We claim:

1. In a hydrocarbon type fluid treating process of the type which comprises subjecting the fluid to high temperature conditions, transferring the hot fluid to a heat exchanger and extracting at least a portion of the heat from the fluid, the improved method for reducing coke formation wherein the transferring step comprises: passing the fluid from the high temperature zone to the throat of a conical expansion zone and expanding the fluid therein, said expansion zone having a length, L, an axis, and minor and major radii, $R_1$ and $R_2$, the length and the radii defining a conical boundary zone, wherein an angle $\theta$ is formed by the intersection of the surface and the axis, and wherein $L/R_1$ is between 3 and 30 and $2\theta$ is less than about $$10^{(1.78 - .39 \log_{10} L/R_1)}$$

2. The method of claim 1 wherein $2\theta$ is greater than about $$10^{(1.54 - .48 \log_{10} L/R_1)}$$

3. The method of claim 1 further comprising: injecting water at a plurality of points into the expansion zone just downstream from the throat to form at least a partial generally laminar conical layer of steam adjacent the walls defining the expansion zone.

4. The method of claim 1 wherein the passing step comprises: passing the fluid through a curved path to exit into said throat at an angle of about 90 degrees from the angle of entry into the curved path; and injecting steam into the curved path proximate the interior point of maximum curvature.

5. In a system for cracking ethane, propane, and the like, to form ethylene, propylene and the like, of the type which includes a cracking unit and a heat exchanger interconnected by a transition section, the improvement wherein the transition section comprises:

an expansion section having an axis, a length L, a smaller end with a minor radius $R_1$, and a larger end with a major radius $R_2$, which define a frusto conical interconnecting wall disposed at an angle with respect to the axis; $L/R_1$ is between 3 and 30 and $2\theta$ is between about $$10^{(1.54 - .48 \log_{10} L/R_1)}$$

and about $$10^{(1.78 - .39 \log_{10} L/R_1)}$$

means for connecting the larger end of the expansion section to the heat exchanger;

conduit means for interconnecting the cracking unit and the smaller end of the expansion section; and means for injecting water into the expansion section proximate the smaller end thereof.

6. The improved transition section of claim 5 wherein the water injecting system comprises:

a plurality of inwardly extending injection members having injection apertures therein oriented for injecting water in a plurality of diverging at least partially overlapping streams adjacent the conical walls of the expansion section.

7. The improved transition section of claim 6 wherein the optimum critical dimensions and angular relationship of the elements of the expansion section are as follows: $L/R_1$ is about 9 and $2\theta$ is about 20 degrees.

8. The improved transition section of claim 6 wherein the water injecting means comprises:

a first set of linearly adjustable inwardly extending injection conduits in the upper portion of the expansion section having injection apertures therein oriented for injecting water in a plurality of diverging at least partially overlapping streams adjacent the upper conical wall of the expansion sections; and a second linearly adjustable set of inwardly extending injection conduits in the lower portion of the expansion section having injection apertures therein oriented for injecting water in a plurality of diverging at least partially overlapping streams adjacent the lower conical wall of the expansion section.

9. An improved transition section, designed for use in systems for transferring coke forming fluids from a high temperature zone to a low temperature zone to reduce the formation of coke during said transfer operation, which comprises:

an expansion section having a smaller end with a minor radius $R_1$, a larger end with a major radius $R_2$, and a length L which define a frusto conical wall, said wall being disposed at an angle $\theta$ with respect to the axis of the smaller end, said larger end connected to a heat exchanger and said smaller end interconnected with a source of said fluids from the high temperature zone, $L/R_1$ being between about 3 and 30 and $2\theta$ being less than about $$10^{(1.78 - .39 \log_{10} L/R)}$$

10. The system which in combination comprises a cracking unit; an L-shaped conduit extending from the cracking unit downwardly first and then outwardly, said conduit having a radius R at the outward opening thereof and being connected at the downward inlet thereof for removing hot cracked fluid from the cracking unit; a frusto conical expansion section having a smaller end connected to the outward opening of the L-shaped conduit and a radius approximately equal to R, a conical wall diverging outwardly at an angle $\theta$ with respect to the axis of the smaller end opening to form a larger end opening, said expansion section having an axial length L, the ratio $L/R$ being between about 3 and about 30 and $2\theta$ being between $$10^{(1.54 - .48 \log_{10} L/R)}$$

and $$10^{(1.78-.39 \log_{10} L/R)}$$

a heat exchanger connected to the larger end opening of the expansion section for receiving the fluid therefrom; a plurality of injection conduits extending inwardly from the upper portion of the conical wall and an additional plurality of injection conduits extending inwardly from the lower portion of the conical wall, said upper plurality and said lower plurality of conduits each having a plurality of injection apertures oriented for forming upper and lower patterns of overlapping streams of water adjacent the conical wall whereby during operation a generally laminar conical sheath of steam is formed between the wall and the main fluid stream.

References Cited

UNITED STATES PATENTS

| | | | |
|---|---|---|---|
| 2,791,549 | 5/1957 | Jahnig | 208—48 |
| 3,174,924 | 3/1965 | Clark et al. | 208—48 |
| 3,414,632 | 12/1968 | Buschmann et al. | 260—683 |
| 3,416,598 | 12/1968 | Dorn | 208—48 |
| 3,429,942 | 2/1969 | Nelson et al. | 260—672 |

DELBERT E. GANTZ, Primary Examiner

C. E. SPRESSER, JR., Assistant Examiner

U.S. Cl. X.R.

196—138; 208—48